Jan. 26, 1926. 1,570,726
F. W. BRODERICK
PIPE CUTTING MACHINE
Filed April 1, 1924   2 Sheets-Sheet 2

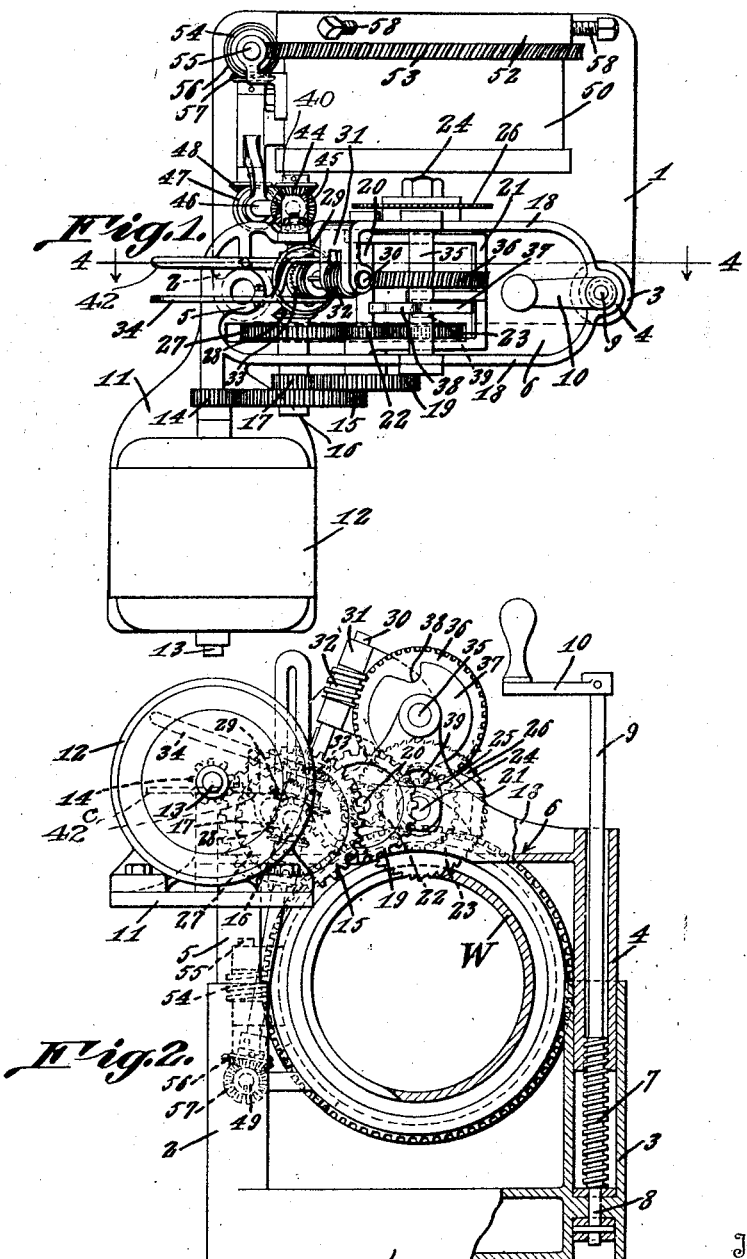

Inventor
F. W. Broderick,
By C. A. Snow & Co.
Attorney

Patented Jan. 26, 1926.

1,570,726

UNITED STATES PATENT OFFICE.

FRANK W. BRODERICK OF MEMPHIS, TENNESSEE, ASSIGNOR OF ONE-HALF TO EMMET H. SLATER, OF MEMPHIS, TENNESSEE.

PIPE-CUTTING MACHINE.

Application filed April 1, 1924. Serial No. 703,558.

*To all whom it may concern:*

Be it known that I, FRANK W. BRODERICK, a citizen of the United States, residing at Memphis, in the county of Shelby and State of Tennessee, have invented a new and useful Pipe-Cutting Machine, of which the following is a specification.

This invention relates to machines designed primarily for cutting pipes, one of the objects of the invention being to provide a simple and compact machine which can be set up readily in a machine shop or other place and utilized for cutting tubes and pipes of various diameters.

Heretofore saws have been used for cutting pipes but it has been necessary to utilize saws the diameters of which have been equal to or greater than the diameter of the object to be cut. This has necessitated the use of excessive power and, because of the size of saw required and its short life, the cost has been almost prohibitive. Where hack saws have been used the cutting operation has been very slow and the cost of producing a cut has been correspondingly increased.

It is an object of the present invention to provide a machine which can utilize a circular saw of small diameter, the work holding portion of the machine being rotatable so that the work will be revolved against the saw during the rotation of the saw thereby producing a quick and accurate cut.

A further object is to provide a machine of this character having means for automatically seating the saw in the work at the start of the cutting operation, said feeding means also serving to release the saw to permit it to be lifted away from the work on the completion of the cut.

Another object is to provide a machine of this character adapted to be easily transported from place to place so that it can be used either in shops or in buildings in course of construction, pipes of all sizes being quickly and accurately cut.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings—

Figure 1 is a plan view of the machine.

Fig. 2 is a front elevation thereof, a portion being shown in section and a partially cut pipe being positioned within the work holder.

Figure 3:
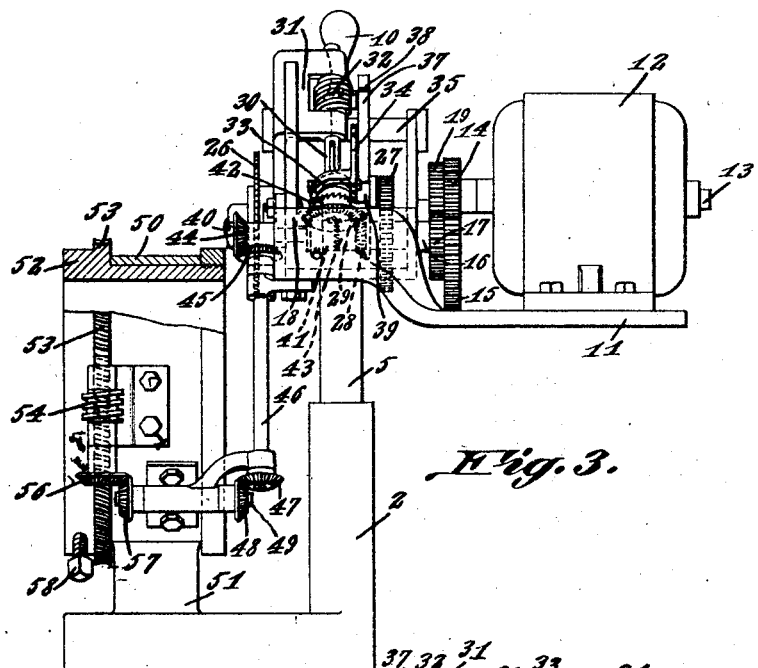
Fig. 3 is a view partly in side elevation and partly in section of the complete machine.
Figure 4:
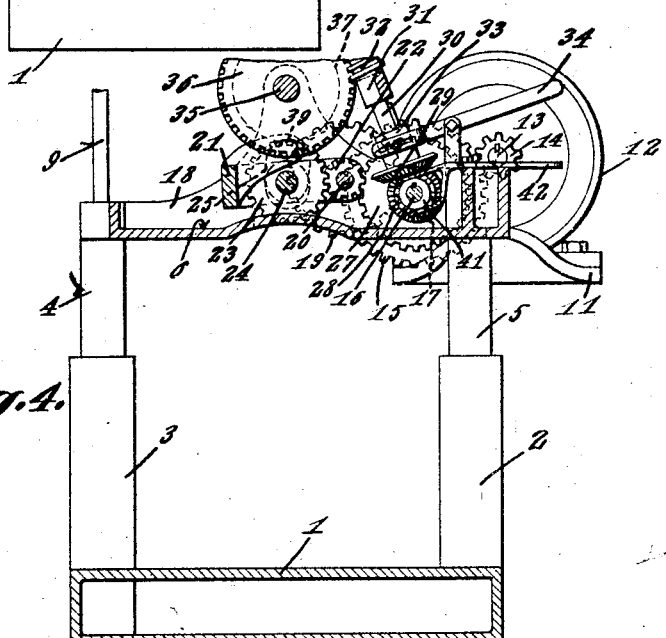
Fig. 4 is a section on line 4—4, Fig. 1.

Referring to the figures by characters of reference 1 designates a base which can be hollow as shown so as to constitute an oil reservoir. This base has upstanding tubular portions 2 and 3 constituting standards in which are slidably mounted hangers 4 and 5 depending from opposed portions of a table 6. The hanger 4 has a feed screw 7 extending into it and engaging the same, this feed screw being swiveled at its lower end in the bottom portion of the standard 3 as shown at 8. A stem 9 projects from this screw and upwardly beyond the table 6, this stem being provided with a crank arm 10 or the like whereby the screw can be located readily for the purpose of elevating or lowering the table 6 relative to the base 1.

The table 6 has an extension 11 on which is mounted an electric motor 12.

The shaft 13 of the motor has a gear 14 which transmits motion to a gear 15 loosely mounted on a shaft or stud 16. A smaller gear 17 is connected to and rotates with the gear 15 upon the shaft 16, this shaft being extended from one of the upstanding sides 18 of the table 6. Gear 17 meshes with a larger gear 19 secured to a shaft 20 journaled in the sides 18 of table 6 and constituting the fulcrum of a small frame 21 movably mounted between the sides 18 of the table 6. A gear 22 rotates with this shaft 20 and rotates with a gear 23 secured to a shaft 24 that is journaled in and projects beyond the sides of the frame 21. Slots 25 are provided in the sides of frame 6 to permit up and down swinging movement of the shaft 24 and the frame 21. Shaft 24 is provided at one end with a circular saw 26 detachably secured thereto in any manner desired.

From the foregoing it will be apparent that when the motor is operated motion will be transmitted therefrom through the loose gears 15 and 17 to gear 19 and thence through gears 22 and 23 to the shaft 24 of the saw 26.

Loosely mounted in the table 6 on the fixed shaft 16 is a gear 27 adapted to be driven by the gear 22. A beveled gear 28 rotates with the gear 27 and meshes with a beveled gear 29 secured to a shaft 30. This shaft is journaled in a bracket 31 mounted on the table 6 and a worm 32 is carried by the shaft. A clutch member 33 is feathered on the shaft 30 and, by means of a lever 34, this clutch member can be shifted into or out of engagement with the hub portion of the gear 29 so as to couple said gear to or uncouple it from the shaft 30.

Journaled in the upstanding sides 18 of the table 6 is a shaft 35 to which is secured a worm gear 36 meshing at all times with the worm 32. A disk 37 rotates with shaft 35 and has a cam recess 38 as shown in Fig. 2. The pivoted frame 21 is provided with a roller 39 adapted to bear against the periphery of the disk 37 so as to limit the upward movement of the frame, shaft 24 and saw 26.

A shaft 40 is journaled in one side of the table 6 preferably in line with the shaft 16. This shaft has a clutch member 41 feathered upon it and adapted to be shifted by means of a lever 42 so as to move into or out of engagement with the clutch member 43 extending from the gear 28. A beveled gear 44 is secured to and rotates with shaft 40 and meshes with a beveled gear 45 secured to an upstanding shaft 46. The lower end of this shaft has a beveled gear 47 meshing with a beveled gear 48 secured to a shaft 49. This shaft is journaled on the outer side of a bearing 50 supported by a pedestal 51 on the base 1. A tubular work holder 52 is mounted for rotation in the bearing 50 and is provided with a worm gear 53 constantly in mesh with a worm 54. This worm is carried by a shaft 55 journaled on the outer side of the bearing 50 and having a gear 56 which meshes with a gear 57 carried by the shaft 49. Thus it will be seen that when the clutch members 41 and 43 are in engagement with each other and the gear 28 is being driven as hereinbefore explained, motion will be transmitted to shaft 40 and thence through gears 44 and 45 to shaft 46. This shaft in turn will drive the gears 47 and 48 and the shaft 49 so that motion will be transmitted through gears 57 and 56 to the worm 54 and the gear 53. Consequently the work holder 52 will be rotated slowly within its bearing 50.

In using this apparatus the pipe or other device to be cut is inserted into the holder 52 and held therein by means of set screws 58. The disk 37 is positioned with the recess 38 directly over the roller 39. By means of the screw 7 and crank arm 10 the table 6 is lowered until the saw 26 comes against the work to be cut. Gear 29 is coupled to shaft 30. The motor 12 is then set in motion. This will result in the slow rotation of shaft 35, disk 37 and gear 36. At the same time the saw 26 will be rotated at a relatively high speed. The rotation of the disk 37 will result in the long wall of recess 38 pressing against the roller 39 and gradually forcing it out of its recess 38 so that the saw will cut into and through the wall of the stock or work W. On the completion of this initial cut the shaft 40 is coupled to gear 28 by means of the clutch members 41 and 43 so that the gear 23 will begin to rotate slowly and cause the work to move slowly against the rotating saw. Thus the saw will cut through the wall of the work and as the work completes one revolution and is completely severed, the recess 38 will be brought to position directly over the roller 39. The mechanism can now be stopped and, by means of screw 7, the table 6 can be raised so as to lift the saw out of the cut.

By means of the clutch levers the operation of the disk 37 and of the feed can be constantly controlled.

What is claimed is:—

1. In a machine of the class described the combination with a rotatable work holder, of an adjustably supported table, a motor, a saw frame pivotally mounted on the table, a rotatable saw, a cam rotatably mounted, means operated by the motor for simultaneously rotating the work holder and the cam at a slow speed and for rotating the saw at a high speed, said cam cooperating with the frame to shift the frame at the beginning of the movement of the cam to force the saw into the work and thereafter to maintain the saw in engagement with the work.

2. In a machine of the class described the combination with a rotatable work holder, of an adjustable table, a saw frame pivotally mounted on the table, a rotatable saw movable with the frame, a disk having a peripheral recess, means on the frame for engaging with the periphery of the disk, a motor, means operated by the motor for driving the work holder and the disk, said disk and the periphery engaging means on the frame cooperating to shift the frame to force a saw into the work and maintain the saw in engagement with the work.

3. The combination with a rotatable work holder, a motor, and speed reducing means for transmitting motion from the motor to the work holder, of a frame movably mounted, a rotatable saw carried by the frame, means operated by the motor for driving the saw when the frame is in any one of its positions, a rotatable cam, and motor driven means for rotating the cam to successively shift the movable frame and hold it in shifted position.

4. The combination with a rotatable work holder, a motor, and speed reducing means for transmitting motion to the work holder from the motor, of a movably mounted saw frame, a rotatable saw carried thereby, means for transmitting motion to the saw from the motor when the frame is in any one of its positions, a rotatable cam, speed reducing means for driving the cam from the motor, and means upon the frame and cooperating with the cam for shifting the frame to one position and maintaining it in said position during the cutting operation of the saw.

In testimony that I claim the foregoing as my own, I have hereto affixed my signature.

FRANK W. BRODERICK.